US008094252B2

(12) United States Patent
Handa et al.

(10) Patent No.: US 8,094,252 B2
(45) Date of Patent: Jan. 10, 2012

(54) DISPLAY APPARATUS AND METHOD FOR DRIVING THE SAME

(75) Inventors: Tomoaki Handa, Tokyo (JP); Tetsuro Yamamoto, Kanagawa (JP); Hideki Sugimoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/923,333

(22) Filed: Sep. 15, 2010

(65) Prior Publication Data

US 2011/0096065 A1 Apr. 28, 2011

(30) Foreign Application Priority Data

Oct. 26, 2009 (JP) ................................. 2009-245176

(51) Int. Cl.
*G02F 1/136* (2006.01)

(52) U.S. Cl. ................ 349/43; 349/19; 349/33; 349/41; 349/42; 349/49

(58) Field of Classification Search .................... 349/19, 349/33, 41, 42, 43, 49, 50
See application file for complete search history.

(56) References Cited

U.S. PATENT DOCUMENTS

| | | | | |
|---|---|---|---|---|
| 7,898,507 | B2 * | 3/2011 | Takei et al. | 345/76 |
| 7,907,137 | B2 * | 3/2011 | Shirasaki et al. | 345/212 |
| 2009/0096725 | A1 * | 4/2009 | Kretz et al. | 345/82 |
| 2009/0122053 | A1 | 5/2009 | Yamamoto et al. | |

FOREIGN PATENT DOCUMENTS

JP 2009-122352 6/2009

* cited by examiner

*Primary Examiner* — Jennifer Doan
(74) *Attorney, Agent, or Firm* — Rader, Fishman & Grauer PLLC

(57) ABSTRACT

A method of driving a display apparatus formed by arranging display devices each having a driving circuit and a current-driven type light emitting portion, the method comprising the steps of: performing a threshold voltage cancelling process in units of a display device row in which a predetermined reference voltage is applied to a gate electrode of a driving transistor of Q×N display devices configuring groups of display device rows and a predetermined driving voltage is applied to one source/drain region of the Q×N display devices so as to change the electric potential of the other source/drain region toward an electric potential calculated by subtracting a threshold voltage of the driving transistor from the reference voltage during a period $T_Q$; and sequentially performing a writing process, in which video signals are applied to the gate electrodes of the driving transistor of N display devices configuring the display device row, Q times.

10 Claims, 9 Drawing Sheets

[EMBODIMENT]

[EMBODIMENT]

[EMBODIMENT]

[EMBODIMENT]

[EMBODIMENT]
FIG.7A [TP (2)-1]
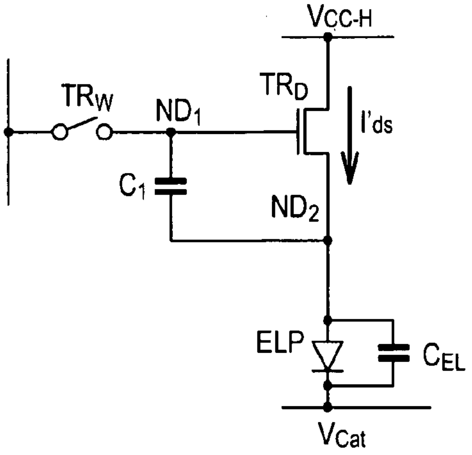
FIG.7B [TP (2)0]
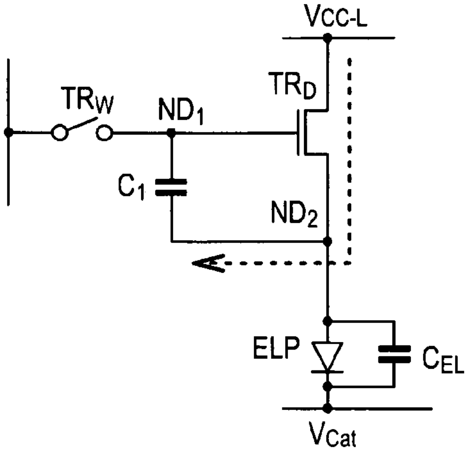
FIG.7C [TP (2)1]
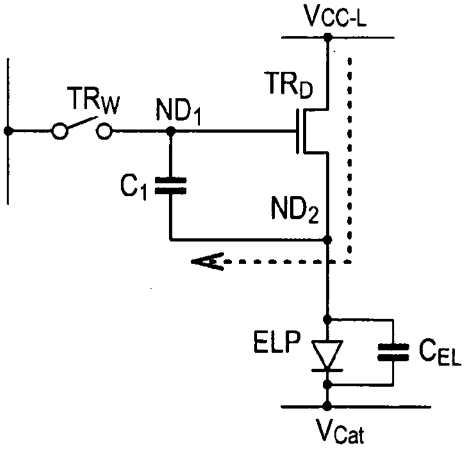
FIG.7D [TP (2)2]
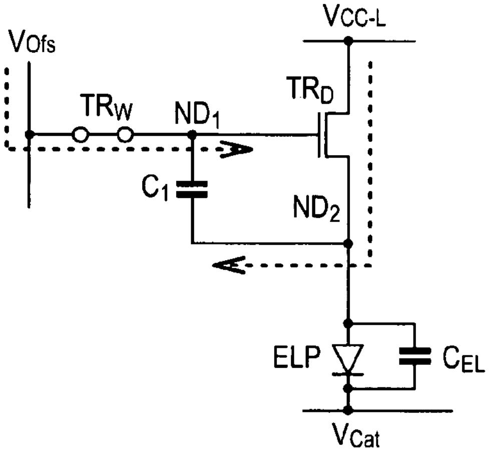
FIG.7E [TP (2)2] (CONTINUE)
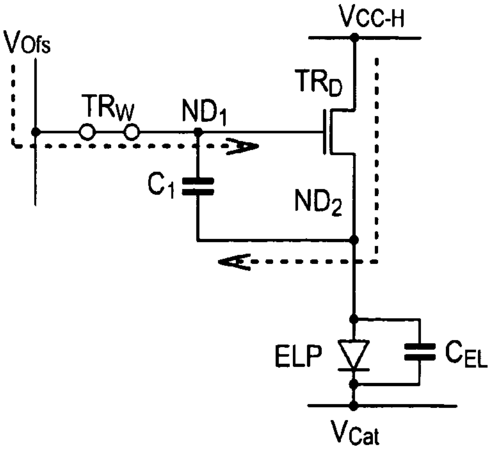
FIG.7F [TP (2)2] (CONTINUE)
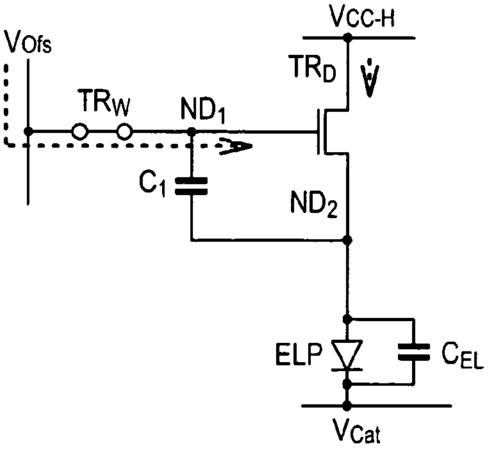

[EMBODIMENT]
*FIG.8A* [TP (2)3]
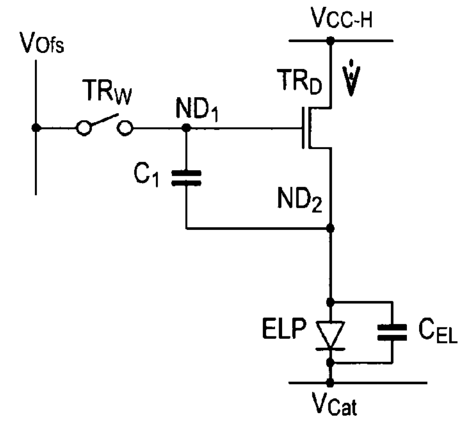
*FIG.8B* [TP (2)3] (CONTINUE)
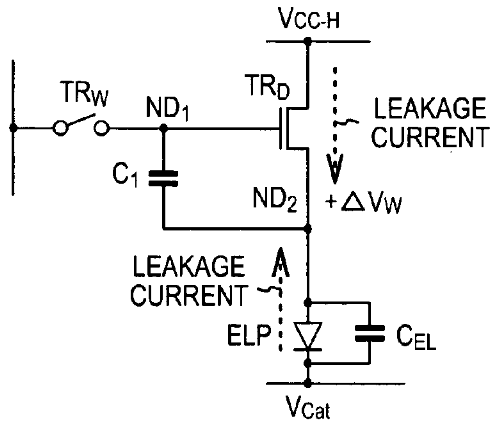
*FIG.8C* [TP (2)4]
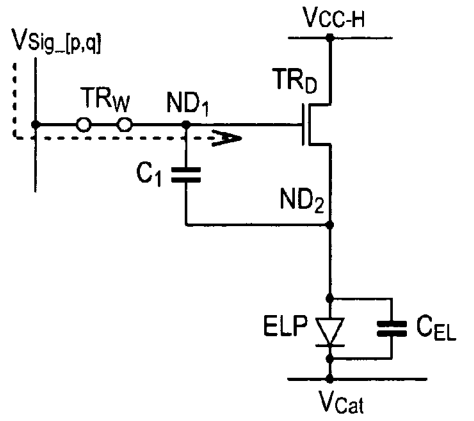
*FIG.8D* [TP (2)5]
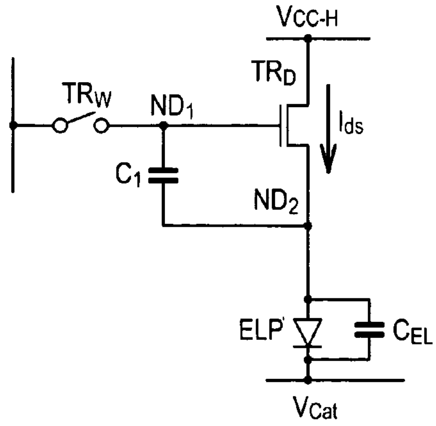

DISPLAY APPARATUS AND METHOD FOR DRIVING THE SAME

BACKGROUND OF THE INVENTION

1. Field of the Invention

The present invention relates to a display apparatus and a method of driving a display apparatus, and more particularly, to a display apparatus having a display device that includes a driving circuit and a current-driven type light emitting portion and a method of driving the display apparatus.

2. Description of the Related Art

Display devices each having a current-driven type light emitting portion and display apparatuses including related display devices are known. For example, display devices each including an organic electroluminescent light emitting portion using the electroluminescence of an organic material have called attention as display devices that can emit light with high luminance through low-voltage DC driving.

Similarly to liquid crystal display apparatuses, as the driving methods of the display apparatuses including a display device having a current-driven light emitting portion, a simple matrix type and an active matrix type are known. The active matrix type has a disadvantage of a complicated structure but has an advantage of capable of raising the luminance of an image and the like. The display device having a current-driven type light emitting portion that is driven by the active matrix further includes a driving circuit used for driving the light emitting portion, in addition to the light emitting portion.

In FIG. 2 of JP-A-2009-122352, a pixel circuit 2 that is configured by a light emitting device EL (it corresponds to a light emitting portion), a sampling transistor T1, a driving transistor T2, and a holding capacitor C1 is disclosed. In addition, in FIG. 1, a display apparatus including a pixel circuit 2 is disclosed.

In JP-A-2009-122352, in order to cancel the influence of the variations in a threshold voltage $V_{th}$ of the driving transistor T2 on a drain current $I_{ds}$ flowing through a light emitting device EL, a threshold voltage correcting operation and a signal electric potential writing operation are performed during one horizontal scanning period. In addition, the difficulty in performing the threshold voltage correcting operation and the signal electric potential writing operation during one horizontal scanning period as the one horizontal scanning period is shortened due to high definition of the display apparatus or the like is disclosed (Paragraph No. 0011 and the like of JP-A-2009-122352).

In JP-A-2009-122352, a composite scanning period including a first period and a second period is set in accordance with a scanning period that is assigned to each of a plurality of scanning lines. During the first period, control signals are output altogether to the plurality of scanning lines, so that threshold voltage correcting operations are performed altogether. In addition, during the second period, control signals are sequentially output to the plurality of scanning lines, and the signal electric potential writing operations are sequentially performed (Paragraph No. 0012 and the like of JP-A-2009-122352).

In FIG. 14 of JP-A-2009-122352, an operation for a case where two horizontal scanning periods (2H) are composed is shown. During the first period, control signals P1 are output altogether to two scanning lines (N-th line and (N+1)-th line), and the threshold voltage correcting operations are performed altogether. Subsequently, during the second period, control signals P2 are sequentially output to two scanning lines, and the signal electric potential writing operations are sequentially performed. As input signals, $V_{ofs}$ is used during the first period, $V_{Sig1}$ is used during the first half of the second period, and $V_{Sig2}$ is used during the second half of the second period. A sampling transistor T1 (N) of the N-th line is in the conductive state in accordance with the control signal P2 and samples $V_{Sig1}$. Subsequently, the sampling transistor T1 (N+1) of the (N+1)-th line is in the conductive state in accordance with the control signal P2 and samples $V_{Sig2}$ (Paragraph No. 0038 and the like of JP-A-2009-122352).

In the threshold voltage correcting operation, as shown in FIG. 7 of JP-A-2009-122352, $V_{ofs}$ is applied to the gate of the driving transistor T2 through the sampling transistor T1 that is in the conductive state, and the first electric potential $V_{cc}$ is applied to the drain of the driving transistor T2. The electric potential of the source of the driving transistor T2 rises as time elapses, and the driving transistor T2 is cut off (in the non-conductive state), and the electric potential of the source thereof becomes ($V_{ofs}$−$V_{th}$) (FIG. 8, Paragraph No. 0028, and the like of JP-A-2009-122352).

SUMMARY OF THE INVENTION

In the operation shown in FIG. 14 of JP-A-2009-122352, during a period from the fall of the control signal P1 of the N-th line to the rise of the control signal P2, the sampling transistor T1 (N) of the N-th line is in the non-conductive state. In addition, during a period from the fall of the control signal P1 of the (N+1)-th line to the rise of the control signal P2, the sampling transistor T1 (N+1) of the (N+1)-th line is also in the non-conductive state.

Ideally, during a period from the fall of the control signal P1 to the rise of the control signal P2, the electric potential of the source of the driving transistor T2 is maintained at ($V_{ofs}$−$V_{th}$). However, actually, during the period from the fall of the control signal P1 to the rise of the control signal P2, a leakage current or the like flows through the light emitting device EL or the driving transistor T2, and the electric potential of the source of the driving transistor T2 slowly changes from the electric potential set by the threshold voltage correcting operation. The degree of the change becomes higher as the period from the fall of the control signal P1 to the rise of the control signal P2 becomes longer.

Accordingly, as the period from the fall of the control signal P1 to the rise of the control signal P2 becomes longer, the signal electric potential writing operation is performed in the state in which the electric potential of the source of the driving transistor T2 is deviated more from the electric potential set by the threshold voltage correcting operation. Then, in the operation shown in FIG. 14 of JP-A-2009-122352, the period from the fall of the control signal P1 of the (N+1)-th line to the rise of the control signal P2 is longer than the period from the fall of the control signal P1 of the N-th line to the rise of the control signal P2. Accordingly, even when a signal electric potential having the same value is written, there is a difference in the current flowing through the light emitting device EL after the signal electric potential writing between the N-th line and the (N+1)-th line. Therefore, the uniformity of luminance of the display apparatus deteriorates.

Thus, it is desirable to provide a display apparatus and a method of driving a display apparatus capable of performing a threshold voltage cancelling process (threshold voltage correcting operation) and a video signal writing process (signal electric potential writing operation) well even in a short scanning period and implementing superior uniformity of luminance.

According to embodiments of the present invention, there are provided a display apparatus and a method of driving the display apparatus. The display apparatus is formed by arranging display devices each having a driving circuit and a current-driven type light emitting portion in a two dimensional matrix pattern in row and column directions, the driving circuit includes at least a driving transistor having a gate electrode and source/drain regions, and a current flows in the light emitting portion through the source/drain regions of the driving transistor.

According to one embodiment of the present invention, there is provided a method of driving a display apparatus including the steps of: when the number of rows of the display devices is denoted by M, the number of the display device rows configuring each row is denoted by N, and a time calculated by dividing a total time for scanning the display devices of the first row to the M-th row for each row by M is denoted by a unit time $t_0$, performing a threshold voltage cancelling process in units of a display device row in which a predetermined reference voltage is applied to the gate electrode of the driving transistor of Q×N display devices configuring the groups of the display device rows and a predetermined driving voltage is applied to one source/drain region of the Q×N display devices so as to change the electric potential of the other source/drain region toward an electric potential calculated by subtracting a threshold voltage of the driving transistor from the reference voltage during a period $T_Q$ that is represented by a product of the number Q of a plurality of the display device rows configuring each group of the display device rows, which is acquired by dividing the display devices of the M rows into a plurality of groups of the display device rows, and the unit time $t_0$; and sequentially performing a writing process, in which video signals are applied to the gate electrodes of the driving transistor of N display devices configuring the display device row, Q times. In addition, the writing process is sequentially performed Q times within a period not exceeding a half of the period $T_0$ and the threshold voltage cancelling process is performed such that a length of a period from the end of the threshold voltage cancelling process to the start of the writing process is constant in each display device row configuring the group of the display device row.

According to another embodiment of the present invention, there is provided a display apparatus. When the number of rows of the display devices is denoted by M, the number of the display devices configuring each row is denoted by N, and a time calculated by dividing a total time for scanning the display devices of the first row to the M-th row for each row by M is denoted by a unit time $t_0$, a threshold voltage cancelling process in which a predetermined reference voltage is applied to the gate electrode of the driving transistor of Q×N display devices configuring the groups of the display device rows and a predetermined driving voltage is applied to one source/drain region of the Q×N display devices so as to change the electric potential of the other source/drain region toward an electric potential calculated by subtracting a threshold voltage of the driving transistor from the reference voltage is performed in units of a display device row during a period $T_Q$ that is represented by a product of the number Q of a plurality of the display device rows configuring each group of the display device rows, which is acquired by dividing the display devices of the M rows into a plurality of groups of the display device rows, and the unit time $t_0$, and a writing process in which video signals are applied to the gate electrodes of the driving transistors of N display devices configuring the display device row is sequentially performed Q times within a period not exceeding a half of the period $T_Q$, and the threshold voltage cancelling process is performed such that a length of a period from the end of the threshold voltage cancelling process to the start of the writing process is constant in each display device row configuring the group of the display device rows.

According to the display apparatus and the method of driving a display apparatus according to the embodiments of the present invention, the length of the period from the end of the threshold voltage cancelling process to the start of the writing process in each display device row configuring a group of display device rows is constant. Accordingly, even when the electric potential of the other source/drain region of the driving transistor is changed due to a leakage current or the like between the end of the threshold voltage cancelling process to the start of the writing process, the degree of the change is approximately the same in each display device configuring the group of display device rows. Accordingly, the degree of change in the luminance accompanied with the change in the electric potential of the other source/drain region of the above-described driving transistor is approximately the same in each display device configuring the group of display device rows. Therefore, it is difficult to visually recognize the relative change in the luminance. Accordingly, the uniformity in the luminance of a displayed image can be improved.

BRIEF DESCRIPTION OF THE DRAWINGS

FIGS. 7A to 7F are diagrams schematically representing the conductive state/non-conductive state of transistors configuring a driving circuit of a display device.

FIGS. 8A to 8D are diagrams, which follow FIG. 7F, schematically representing the conductive state/non-conductive state of the transistors configuring the driving circuit of a display device.

DESCRIPTION OF THE PREFERRED EMBODIMENTS

Figure 1:
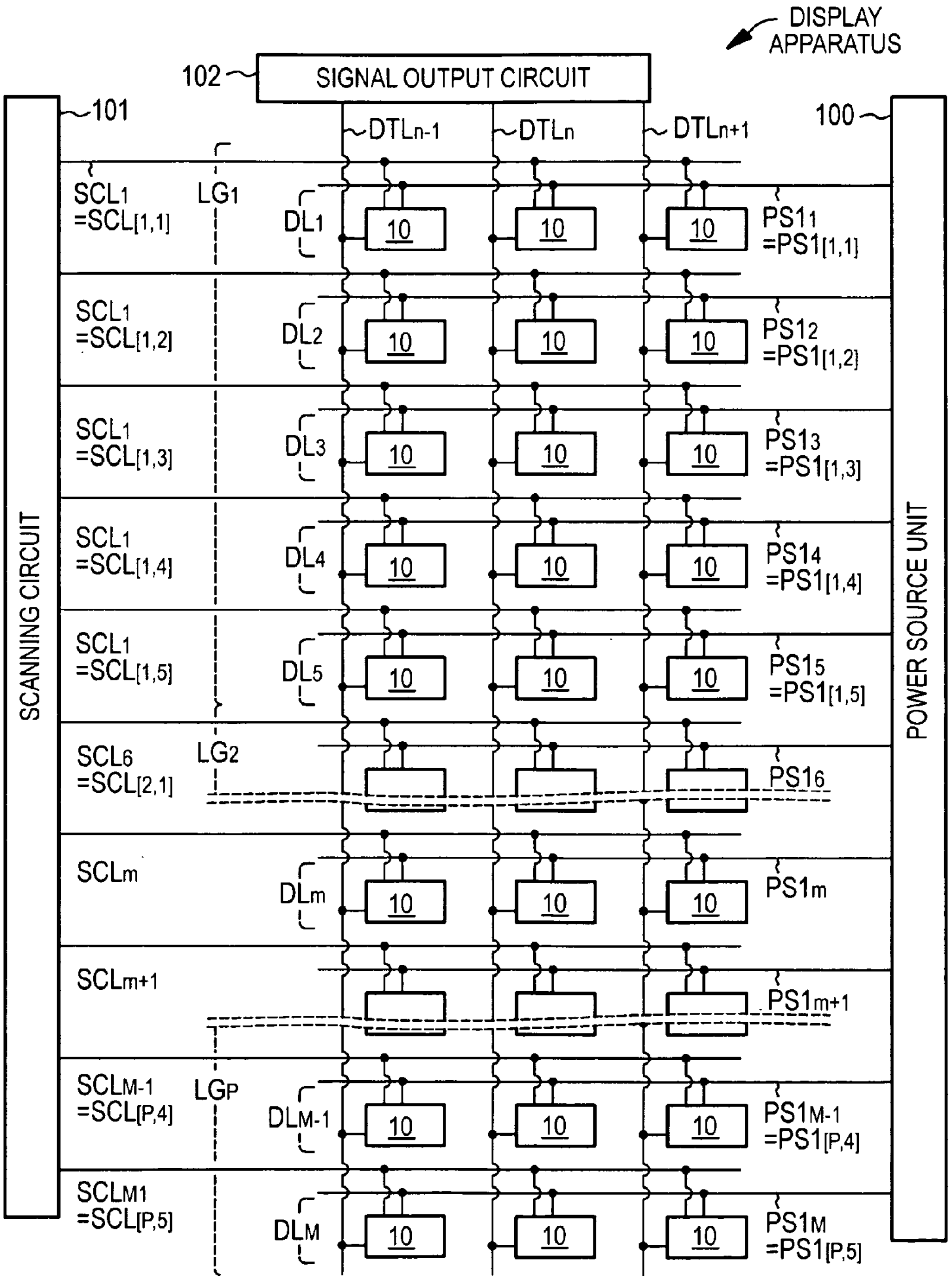
FIG. 1 is a schematic diagram showing a display apparatus according to an embodiment.

Hereinafter, preferred embodiments of the present invention will be described with reference to the accompanying drawings. However, the present invention is not limited thereto, and various numerical values and materials described in the embodiments are merely examples. The description will be presented in the following order.

1. Display Apparatus and Method of Driving Display Apparatus according to Embodiments of the Present Invention and Overall Description 2. Embodiment Display Apparatus and Method of Driving Display Apparatus According to Embodiments of the Present Invention and Overall Description In a display apparatus and a method of driving a display apparatus according to embodiments of the present invention (hereinafter, these may be collectively referred to as the present invention), display devices of M rows are divided into a plurality of groups of display device rows. A plurality of display device rows that configure a group of display device rows may be adjacently disposed. Alternatively, all or a part of the plurality of display device rows may be configured to be disposed separately from each other. From the viewpoint of easiness in control of the display apparatus and the like, it is preferable that the plurality of display device rows are disposed to be adjacent to each other.

The number Q of display device rows that configure one group of display device rows may be appropriately set in accordance with the design of the display apparatus and the like with several percent of the number M of rows of the display devices being set as an upper limit. The minimum value of Q is 2. However, from the viewpoint of securing a period, during which a threshold voltage cancelling process is performed, to be sufficiently long, the value of Q is preferably large to some degree. Although depending on the value of M, as examples, the value of Q is in the range of 3 to 25, is preferably in the range of 4 to 20, and is more preferably in the range of 5 to 15. The value of Q may be the same value in each group of display device rows or may be different in a part of the group of display device rows. For example, when there is remainder in a case where the display devices of M rows are equally divided into a plurality of groups of display device rows, the display device rows corresponding to the remainder may be configured to be appropriately distributed to the groups of display device rows. From the viewpoint of easiness in control of the display apparatus, the value of Q is preferably configured to be the same value in each group of display device rows. In some situations, the value of Q may be different in all the groups of display device rows.

In the method of driving the display apparatus according to the embodiment of the present invention, in order to sequentially perform a writing operation of applying video signals to gate electrodes of driving transistors of N display devices configuring the display device row Q times, it is convenient to perform the writing process in order of the arrangement of the display device rows configuring the group of display device rows. However, the order is not limited thereto. Thus, the order of performing the writing process can be appropriately set in accordance with the design of the display apparatus and the like. In addition, the same applies to a case where a writing process is sequentially performed Q times in the display apparatus according to the embodiment of the present invention.

According to the embodiment of the present invention, when the display apparatus is sequentially scanned for each display device row, a unit time $t_0$ corresponds to a time assigned to each display device row. In other words, the unit time $t_0$ corresponds to a scanning period when the display apparatus is scanned in units of one row in a line sequential manner, and more particularly, to a so-called horizontal scanning period.

In the method of driving a display apparatus according to the embodiment of the present invention, the length of a period during which a threshold voltage cancelling process is performed in each display device row configuring the group of display device rows, may be configured to be constant. In such a configuration, the relationship between the period, during which the threshold voltage cancelling process is performed, and a period, during which a writing process is performed, in the display device rows is the same in each display device row. In addition, in the display apparatus according to the embodiment of the present invention, the length of the period during which the threshold voltage cancelling process is performed may be configured to be constant.

In the preferred configuration according to the embodiment of the present invention described as above, it may be configured that the display apparatus further includes a plurality of scanning lines extending in the row direction and a plurality of data lines extending in the column direction, a driving circuit further includes a writing transistor that has a gate electrode connected to a scanning line, one source/drain region connected to a data line, and the other source/drain region connected to the gate electrode of a driving transistor. Accordingly, in such a case, by allowing the writing transistor to be in a conductive state based on a scanning signal transmitted from the scanning line, a video signal transmitted from the data line and a predetermined reference voltage is applied to the gate electrode of the driving transistor.

In the method of driving a display apparatus according to the embodiment of the present invention that has various preferred configurations as described above, by performing a writing process in the state in which a predetermined driving voltage is applied to one source/drain region of the driving transistor, the electric potential of the other source/drain region of the driving transistor may be configured to change. In addition, in a display apparatus according to the embodiment of the present invention that includes various preferred configurations as described above, by performing a writing process in the state in which a predetermined driving voltage is applied to the one source/drain region of the driving transistor, the electric potential of the other source/drain region of the driving transistor may be configured to change.

In the embodiment of the present invention that has various preferred configurations described as above, it may be configured that the driving circuit further includes a capacitor portion that has one electrode connected to the other source/drain region of the driving transistor and the other electrode connected to the gate electrode of the driving transistor, and a light emitting portion is connected to the other source/drain region of the driving transistor. In such a case, by stopping application of a video signal to the gate electrode of the driving transistor after each writing process, a current corresponding to the value of a voltage maintained in the capacitor portion flows to the light emitting portion through the source/drain region of the driving transistor.

In the embodiment of the present invention that has various preferred configurations described as above, it may be configured that the display apparatus further includes a plurality of feeder wires extending in the row direction, the one source/drain region of the driving transistor is connected to the feeder wire, and a predetermined driving voltage is applied to the one source/drain region of the driving transistor from the feeder wire.

As the light emitting portion of the current-driven type, an organic electroluminescent light emitting portion, an inorganic electroluminescent light emitting portion, an LED light emitting portion, a semiconductor laser light emitting portion, or the like may be used. Such a light emitting portion can be configured by using a known material and a known method. From the viewpoint of configuring a flat-panel display apparatus for color display, the light emitting portion is preferably configured by the organic electroluminescent light emitting portion among the above-described light emitting portions. The organic electroluminescent light emitting portion may be a so-called top emission type or bottom emission type.

Here, a case where "the length of the period from the completion of a threshold voltage cancelling process to the start of a writing process in each display device row configuring the group of the display device rows is constant" includes not only a case where the length of the period is rigorously constant but also a case where the length of the period is substantially constant. In a case where an average length of the period from the completion of a threshold voltage cancelling process to the start of a writing process in the display device row configuring the group of the display device rows is used as a reference, when the period is in the range of 0.8 times to 1.2 times the average length, the length of the period is regarded to be substantially constant. In addition, the above-description similarly applies to "the length of the period during which a threshold voltage cancelling process is performed in each display device row configuring the group of the display device rows is constant".

In the descriptions here, conditions represented in various equations are satisfied not only in a case where the equations are mathematically satisfied rigorously, but also in a case where the equations are substantially satisfied. Regarding satisfaction of the equation, the existent of various variations in the display devices or the display apparatuses that are generated in the design or in the manufacturing process is allowed.

According to the embodiment of the present invention, when the electric potential of the other source/drain region of the driving transistor reaches an electric potential that is acquired by subtracting a threshold voltage of the driving transistor from the reference voltage by performing the threshold voltage cancelling process, the driving transistor becomes in a non-conductive state. On the other hand, when the electric potential of the other source/drain region of the driving transistor does not reach the electric potential that is acquired by subtracting the threshold voltage of the driving transistor from the reference voltage, the driving transistor is not in the non-conductive state. In the embodiment of the present invention, the non-conductive state of the driving transistor is not necessary as the result of the threshold voltage cancelling process.

The display apparatus may have a configuration of a so-called monochrome display or a configuration of a color display. For example, a configuration of a color display in which one pixel is formed by a plurality of sub-pixels, in particular, one pixel is formed by three sub-pixels of a red light emitting sub-pixel, a green light emitting sub-pixel, and a blue light emitting sub-pixel may be used. Furthermore, the display apparatus may be configured by one set (for example, one set acquired by adding a sub-pixel that emits white light for improving the luminance, one set acquired by adding a sub-pixel that emits complementary color light for increasing the range of color reproduction, one set acquired by adding a sub-pixel that emits yellow light for increasing the range of color reproduction, and one set acquired by adding sub-pixels that emit yellow light and cyan light for increasing the range of color reproduction) that is configured by adding one or a plurality of sub-pixels to the above-described three-type sub-pixels.

As the number of pixels of the display apparatus, several resolutions of image display such as VGA (640, 480), S-VGA (800, 600), XGA (1024, 768), APRC (1152, 900), S-XGA (1280, 1024), U-XGA (1600, 1200), HD-TV (1920, 1080), Q-XGA (2048, 1536), (1920, 1035), (720, 480), and (1280, 960) may be presented as examples, However, the number of the pixels of the display apparatus is not limited thereto.

In the display apparatus, various wirings such as the scanning lines, the data lines, and the feeder wires and the light emitting portion may have known configurations or structures. For example, in a case where the light emitting portion is configured by an organic electroluminescent light emitting portion, the light emitting portion may be configured by an anode electrode, a hole transport layer, a light emitting layer, an electron transport layer, a cathode electrode, and the like. Various circuits, to be described later, such as a power source unit, a scanning circuit, and a signal output circuit may be configured by known circuit components.

As an example of a transistor that configures the driving circuit, there is an n-channel thin film transistor (TFT). The transistor configuring the driving circuit may be an enhancement type or a depression type. In the n-channel transistor, an LDD structure (Lightly Doped Drain Structure) may be formed. In some situations, the LDD structure may be formed as being asymmetric. A large current flows through the driving transistor when the display device emits light. Thus, for example, a configuration in which the LDD structure is formed only on the one source/drain region side that becomes the drain region side at the time of light emission may be used. In addition, for example, a p-channel thin film transistor may be used as the above-described transistor.

The capacitor portion that configures the driving circuit may be configured by one electrode, the other electrode, and a dielectric layer interposed therebetween. The transistor and the capacitor portion, described above, that configure the driving circuit are formed within a plane (for example, formed on a support body), and the light emitting portion is formed on the upper side of the transistor and the capacitor portion, which configure the driving circuit, for example, through an interlayer insulating layer. In addition, the other source/drain region of the driving transistor is connected to one end (an anode electrode or the like that is included in the light emitting portion) of the light emitting portion, for example, through a contact hole. In addition, a configuration in which a transistor is formed on a semiconductor substrate or the like may be used.

Of the two source/drain regions included in one transistor, the term "one source/drain region" may be used with the meaning of a source/drain region connected to the power source side. In addition, the state in which a transistor is conductive represents a state in which a channel is formed between the source/drain regions. Such a state is formed regardless of whether or not a current flows from the one source/drain region of the transistor to the other source/drain region thereof. On the other hand, the state in which a transistor is not conductive represents a state in which any channel is not formed between the source/drain regions. The source/drain region can be configured by using not only a conductive material such as poly silicon or amorphous silicon that contains impurities but also a layer that is formed from metal, alloy, conductive particles, and a stacked structure thereof, or an organic material (conductive polymer).

In a timing chart used in the description presented below, the length (time length) of the horizontal axis that represents each period is schematically shown and does not represent the ratio of time lengths of periods. This applies equally to the vertical axis. In addition, the shape of a waveform shown in the timing chart is also schematically represented.

Embodiment

A method of driving a display apparatus and a display apparatus according to embodiments of the present invention will now be described.

Figure 2:
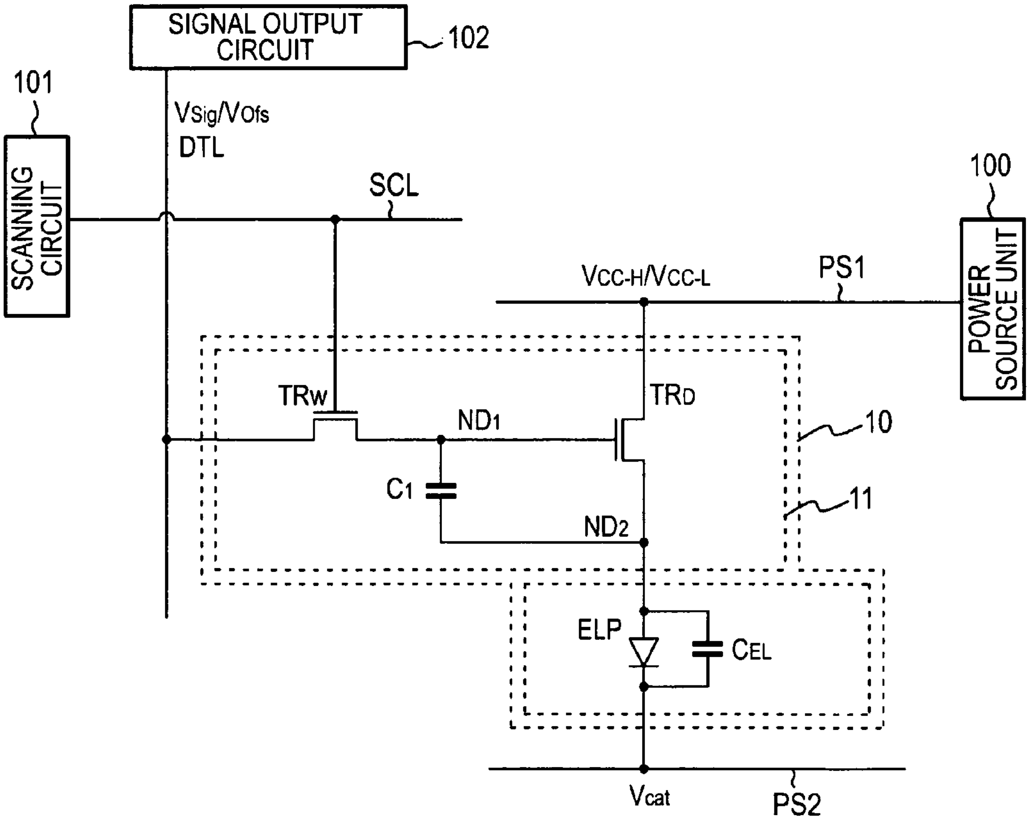
FIG. 2 is an equivalent circuit diagram of a display device that includes a driving circuit.

A schematic diagram of the display apparatus of the embodiment is shown in FIG. 1. An equivalent circuit diagram of a display device 10 that includes a driving circuit 11 is shown in FIG. 2. As shown in FIG. 1, the display apparatus of the embodiment is formed by arranging the display devices 10 each having the driving circuit 11 and a current-driven type light emitting portion ELP in a two-dimensional matrix pattern in the row and column directions. N display devices are arranged in the row direction, and M display devices are arranged in the column direction. As a result, a total of N×M display devices 10 are arranged. In FIG. 1, the display devices forming three columns are represented. However, the arrangement of the display devices 10 is merely an example.

The display apparatus further includes a plurality of scanning lines SCL that are connected to a scanning circuit 101 and extend in the row direction, a plurality of data lines DTL that are connected to a signal output circuit 102 and extend in the column direction, and a plurality of feeder wires PS1 that are connected to a power source unit 100 and extend in the row direction.

The number of rows of the display devices 10 is M, and the number of the display devices 10 configuring each row is N. The display devices 10 of the m-th row (here, m=1, 2, . . . , M) are connected to the m-th scanning line $SCL_m$ and the m-th feeder wire $PS1_m$, thereby configuring one display device row $DL_m$. In addition, the display devices 10 of the n-th row (here, n=1, 2, . . . , N) are connected to the n-th data line $DTL_n$.

As shown in FIG. 2, the driving circuit 11 includes at least a driving transistor $TR_D$ that has a gate electrode and source/drain regions. A current flows through the light emitting portion ELP through the source/drain regions of the driving transistor $TR_D$. The display device 10 has a structure in which the driving circuit 11 and the light emitting portion ELP connected to the driving circuit 11 are stacked. The light emitting portion ELP is formed by an organic electroluminescent light emitting portion.

The driving circuit 11 further includes a writing transistor $TR_W$ and a capacitor portion $C_1$, in addition to the driving transistor $TR_D$. The driving transistor $TR_D$ is formed by an n-channel TFT that has a gate electrode and source/drain regions. In addition, the writing transistor $TR_W$ is formed by an n-channel TFT that has a gate electrode and source/drain regions. In addition, for example, a configuration in which the writing transistor $TR_W$ is formed by a p-channel TFT may be used. In addition, the driving circuit 11 may further include an additional transistor. The capacitor portion $C_1$ will be described later.

One source/drain region of the driving transistor $TR_D$ is connected to the feeder wire PS1. The other source/drain region is connected to one end (in this embodiment, an anode electrode that is included in the light emitting portion ELP) of the light emitting portion ELP and is connected to one electrode of the capacitor portion $C_1$. The gate electrode is connected to the other source/drain region of the writing transistor $TR_W$ and is connected to the other electrode of the capacitor portion $C_1$.

In the writing transistor TRw, one source/drain region is connected to the data line DTL, and the gate electrode is connected to the scanning line SCL.

To the gate electrode of the driving transistor $TR_D$, the other source/drain region of the writing transistor $TR_W$ and the other electrode of the capacitor portion $C_1$ are connected, and the gate electrode of the driving transistor $TR_D$ forms a first node $ND_1$. To the other source/drain region of the driving transistor $TR_D$, the one electrode of the capacitor portion and one end (described in detail, the anode electrode) of the light emitting portion ELP are connected, and the other source/drain region of the driving transistor $TR_D$ forms a second node $ND_2$.

The other end (described in detail, the cathode electrode) of the light emitting portion ELP is connected to a second feeder wire PS2. The second feeder wire PS2 is common to all the display devices 10. In FIG. 1, the feeder wire PS2 is not shown.

To the cathode electrode of the light emitting portion ELP, a predetermined voltage $V_{Cat}$ is applied from the second feeder wire PS2. The capacitance of the light emitting portion ELP is denoted by a sign $C_{EL}$. In addition, a threshold voltage that is necessary for light emission of the light emitting portion ELP is denoted by $V_{th\text{-}EL}$. In other words, when a voltage that is equal to or higher than $V_{th\text{-}EL}$ is applied between the anode electrode and the cathode electrode of the light emitting portion ELP, the light emitting portion ELP emits light.

The light emitting portion ELP has a known configuration or structure, for example, that is formed by an anode electrode, a hole transport layer, a light emitting layer, an electron transport layer, a cathode electrode, and the like. The power source unit 100, the scanning circuit 101, the signal output circuit 102, the scanning lines SCL, the data lines DTL, the feeder wires PS1, and the second feeder wires PS2 may have known configurations or structures.

Here, the voltage of the driving transistor $TR_D$ is set such that the driving transistor operates in a saturated region in the light emitting state of the display device 10. Thus, the driving transistor $TR_D$ is driven so as to allow a drain current $I_{ds}$ to flow according to the following Equation (1). In the light emitting state of the display device 10, the one source/drain region of the driving transistor $TR_D$ serves as a drain region, and the other source/drain region serves as a source region. For convenience of description, in the description presented below, the one source/drain region of the driving transistor $TR_D$ may be simply referred to as a drain region, and the other source/drain region may be simply referred to as a source region. Here, the signs are defined as follows.

μ: effective mobility

L: channel length

W: channel width $V_{gs}$: electric potential difference between gate electrode and source region $V_{th}$: threshold voltage $C_{ox}$: (relative permittivity of gate insulating layer)×(permittivity of vacuum)/(thickness of gate insulating layer)

$$k\Xi(1/2)\cdot(W/L)\cdot C_{ox}$$

$$I_{ds}=k\cdot\mu\cdot(V_{gs}-V_{th})^2 \quad \text{Equation (1)}$$

By allowing this drain current $I_{ds}$ to flow through the light emitting portion ELP, the light emitting portion ELP of the display device 10 emits light. The light emitting state (luminance) of the light emitting portion ELP of the display device 10 is controlled in accordance with the value of the drain current $I_{ds}$.

To the one source/drain region of the writing transistor $TR_W$, a predetermined voltage is applied from the data line DTL based on the operation of the signal output circuit 102.

In particular, a video signal (driving signal or luminance signal) $V_{Sig}$ used for controlling the luminance of the light emitting portion ELP and a reference voltage $V_{Ofs}$ to be described later are supplied from the signal output circuit 102. The conductive state/non-conductive state of the writing transistor $TR_W$ is controlled in accordance with a scanning signal transmitted from the scanning line SCL that is connected to the gate electrode of the writing transistor $TR_W$, and more particularly, a scanning signal transmitted from the scanning circuit 101.

Figure 3:
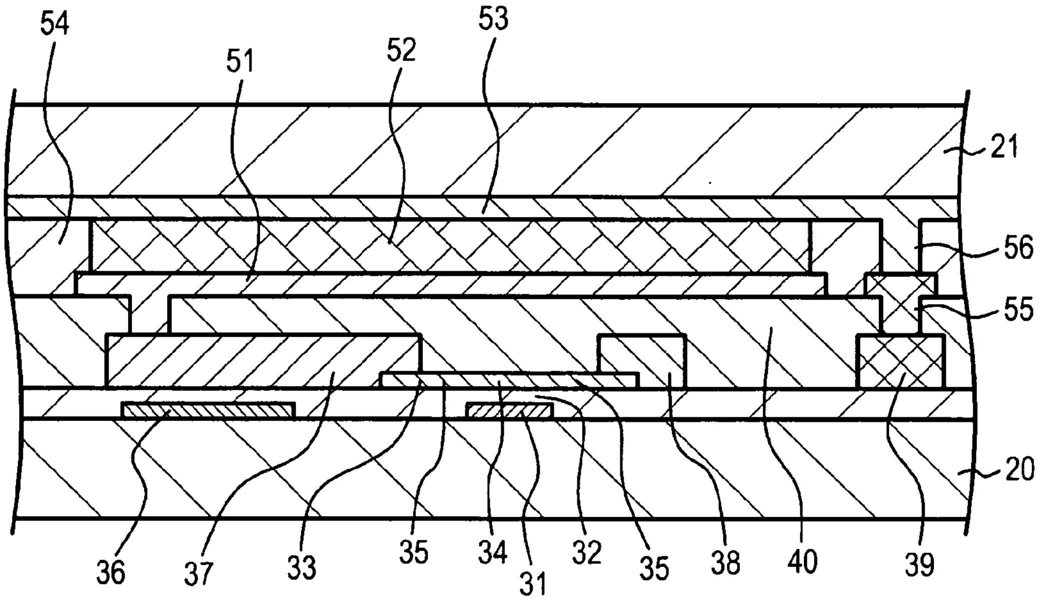
FIG. 3 is a schematic partial cross-sectional view of the display apparatus.

FIG. 3 shows a schematic partial cross-sectional view of the display apparatus. The transistors $TR_D$ and $TR_W$ and the capacitor portion $C_1$ that configure the driving circuit 11 is formed on a support body 20, and the light emitting portion ELP, for example, is formed on the upper side of the transistors $TR_D$ and $TR_W$ and the capacitor portion $C_1$ that configure the driving circuit 11 through the interlayer insulating layer 40. In addition, the other source/drain region of the driving transistor $TR_D$ is connected to the anode electrode included in the light emitting portion ELP through a contact hole. In FIG. 3, only the driving transistor $TR_D$ is shown. The other transistors are hidden so as not to be visible.

Described in more detail, in the driving transistor $TR_D$, a portion of the semiconductor layer 33 between the source/drain regions 35 and 35 and the source/drain regions 35 and 35 that are disposed in the gate electrode 31, the gate insulating layer 32, and the semiconductor layer 33 is configured by a corresponding channel forming region 34. In addition, the capacitor portion $C_1$ is formed by the other electrode 36, a dielectric layer that is configured by an extending portion of the gate insulating layer 32, and one electrode 37. The gate electrode 31, a part of the gate insulating layer 32, and the other electrode 36 that configures the capacitor portion $C_1$ are formed on the support body 20. The one source/drain region 35 of the driving transistor $TR_D$ is connected to a wiring 38 (it corresponds to the feeder wire PS1), and the other source/drain region 35 is connected to the one electrode 37. The driving transistor $TR_D$, the capacitor portion $C_1$, and the like are covered with the interlayer insulating layer 40, and the light emitting portion ELP that is formed by the anode electrode 51, the hole transport layer, the light emitting layer, the electron transport layer, and the cathode electrode 53 are disposed on the interlayer insulating layer 40. In the figure, the hole transport layer, the light emitting layer, and the electron transport layer are shown as one layer 52. On a portion of the interlayer insulating layer 40 in which the light emitting portion ELP is not disposed, a second interlayer insulating layer 54 is disposed, and on the second interlayer insulating layer 54 and the cathode electrode 53, a transparent substrate 21 is disposed. The light emitted in the light emitting layer is transmitted to the outside through the substrate 21. In addition, the one electrode 37 and the anode electrode 51 are connected to each other through a contact hole disposed in the interlayer insulating layer 40. The cathode electrode 53 is connected to a wiring 39 (it corresponds to the second feeder wire PS2) that is disposed on the extending portion of the gate insulating layer 32 through the contact holes 56 and 55 disposed in the second interlayer insulating layer 54 and the interlayer insulating layer 40.

The method of manufacturing the display apparatus shown in FIG. 3 and the like will be described. First, various wirings such as the scanning lines SCL, the electrodes configuring the capacitor portion $C_1$, the transistors that are formed from the semiconductor layer, the interlayer insulating layer, the contact hole, and the like are appropriately formed on the support body 20 by using a known method. Thereafter, film formation and patterning are performed by using a known method so as to form the light emitting portions ELP that are arranged in a matrix pattern. Then, the support body 20 for which the above-described processes have been performed is disposed to face the substrate 21, the periphery thereof is sealed, and wires are connected, for example, to external circuits, whereby a display apparatus can be acquired.

The display apparatus of the embodiment is a display apparatus for color display that includes a plurality of display devices 10 (for example, N×M=1920×480). Each display device 10 configures a sub-pixel, and one pixel is configured by a group formed by a plurality of sub-pixels, and the pixels are arranged in a two-dimensional matrix pattern in the row and column directions. One pixel is configured by three types of sub-pixels including a red light emitting sub-pixel, a green light emitting sub-pixel, and a blue light emitting sub-pixel that are aligned in the extending direction of the scanning lines SCL.

The display apparatus is configured by (N/3)×M pixels that are arranged in a two-dimensional matrix pattern. The display frame rate is assumed to be FR (times/seconds). The display devices 10 configuring each of (N/3) pixels (N sub-pixels) arranged in the m-th row are simultaneously driven. In other words, the emission/non-emission timings of N display devices 10 configuring one display device row DL are controlled in units of a display device row to which the display devices belong. A time that is acquired by dividing a total time for scanning the display devices 10 of the first row to the M-th row for each row by M is denoted by a unit time $t_0$. As described above, the unit time $t_0$ corresponds to a scanning time per one row when the display devices are scanned in units of one row in a line sequential manner, and more particularly, to a time length of one horizontal scanning period (so-called 1H). The unit time $t_0$ is shorter than (1/FR)×(1/M) seconds.

In the description presented below, for convenience, the display devices 10 of M rows are divided into a plurality of groups of display device rows that are formed from adjacent display device rows DL, and the number Q of a plurality of display device rows DL that configure each group of display device rows is the same value. In addition, in order to sequentially perform the writing process Q times, the wiring process is performed in accordance with the arrangement order of the display device rows configuring the group of display device rows. FIG. 1 represents a case where Q=5 as an example. When the number of the groups of display device row is denoted by P, in this case, P=M/5. The first group $LG_1$ of display device rows is configured by a display device row $DL_1$ to a display device row $DL_5$, and the second group $LG_2$ of display device rows is configured by a display device row $DL_6$ to a display device row $DL_{10}$. The P-th group $LG_p$ of display device rows is configured by a display device row $DL_{M-4}$ to a display device row $DL_M$ (in FIG. 1, a display device row $DL_6$ to a display device row $DL_{10}$, and, a display device row $DL_{M-4}$ to a display device row $DL_{M-2}$ are not shown). Here, Q=5 is a merely example.

Here, the p-th (here, p=1, 2, 3, . . . , P) group of display device rows is denoted by a sign $LG_p$, and the q-th (here, q=1, 2, 3, . . . , Q) display device row DL in the group $LG_p$ of display device rows is denoted by a display device row DL of the [p, q]-th row. The display devices 10 of the M rows are divided into groups LG of display device rows formed by adjacent display device rows DL. Under the condition that the number Q of display device rows DL configuring each group of display device rows LG is the same for all the groups LG of display device rows, a display device row DL of the [p, q]-th row corresponds to a display device row DL of the $(Q\cdot(p-1)+q)$-th row. In the description presented below, for example, a scanning line SCL or a feeder wire PS1 belonging to the display device row DL of the [p, q]-th row is denoted by using the notation of [p, q]. This applies equally to another display device row DL. In addition, a video signal $V_{Sig}$ applied to the signal line DTL is denoted by using the same notation.

Figure 4:
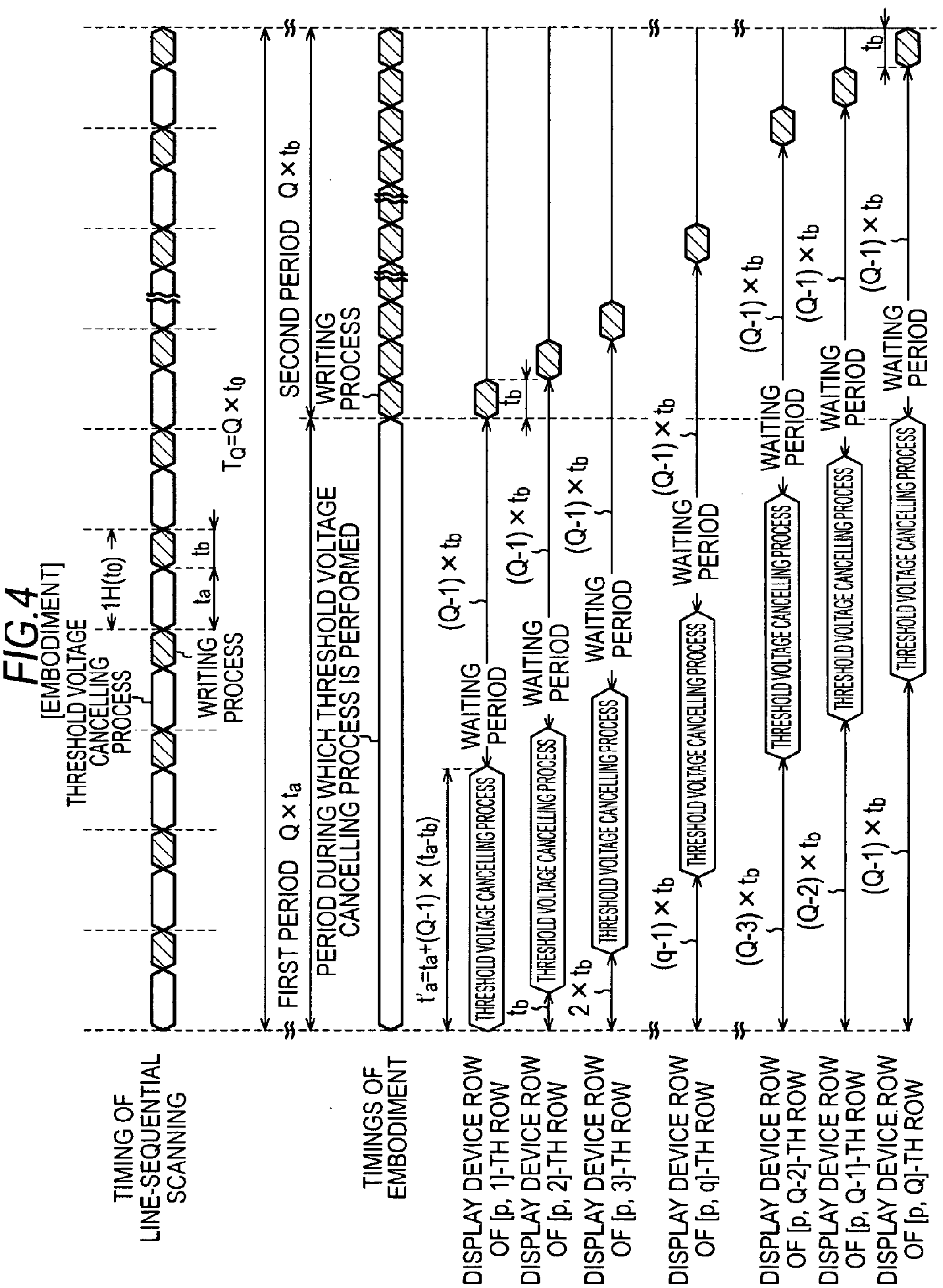
FIG. 4 is a schematic diagram representing various timings in a method of driving a display apparatus according to an embodiment.

Thereafter, a method of driving a display device of the embodiment (hereinafter, abbreviated as the driving method of the embodiment) will be described. FIG. 4 is a schematic diagram representing various timings in the driving method of the embodiment. First, when a threshold voltage cancelling process and a writing process are performed within one scanning period, and more particularly, within one horizontal scanning period (so called 1H) while scanning the display apparatus in units of a row in a line-sequential manner, it is assumed that the threshold voltage cancelling process is performed during a period $t_a$ within one horizontal scanning period (1H), and then, the writing process is performed during a period $t_b$ within one horizontal scanning period (1H). As described above, one horizontal scanning period (1H) corresponds to a unit time $t_0$, and there is the relationship of $t_0=t_a+t_b$.

Figure 5:
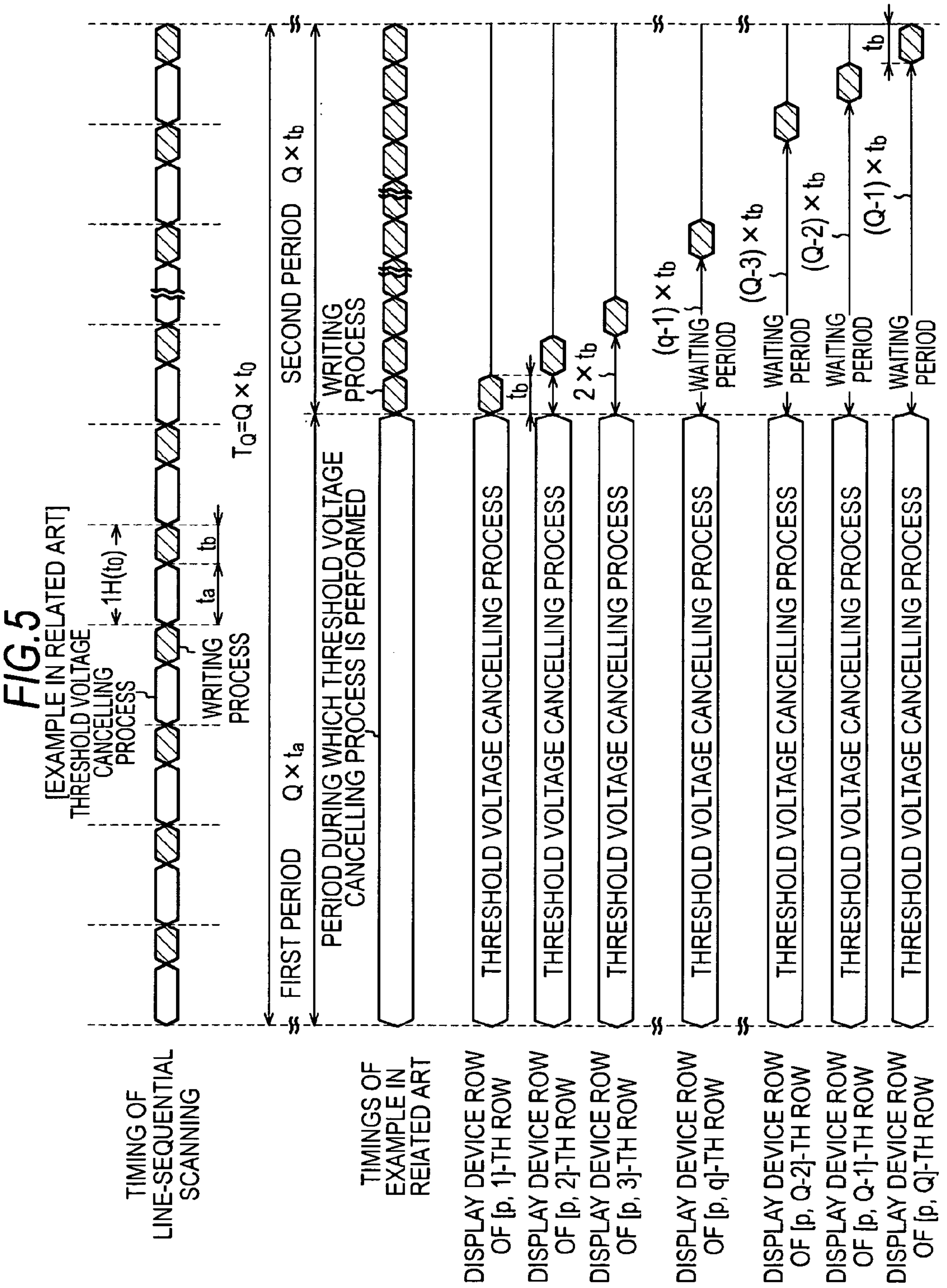
FIG. 5 is a schematic diagram representing various timings in a method of driving a display apparatus according to an example in related art.

In addition, a schematic diagram representing various timings in a method of driving a display apparatus according to an example in related art (hereinafter, abbreviated as a driving method of an example in related art), in which the threshold voltage cancelling process is performed altogether during the first period, is shown in FIG. 5.

In addition, the operation of the threshold voltage cancelling process will be described later in the description of an operation during [Period-TP($2$)$_2$] shown in FIG. 6. Similarly, the operation of the writing process will be described in detail in the description of the operation during [Period-TP($2$)$_4$] shown in FIG. 6.

In the driving method of the embodiment, for Q×N display devices 10 configuring the group LG of display device rows that are disposed in the display device row DL of the Q-th row configuring the p-th group $LG_p$ of the display device group during a first half (the first period) of a period $T_Q$ represented by $Q\times(1H)=Q\times t_0$, the threshold voltage cancelling process, in which a predetermined reference voltage $V_{Ofs}$ is applied to the gate electrode of the driving transistor $TR_D$, and a predetermined driving voltage $V_{CC\text{-}H}$ is applied to one source/drain region, whereby changing the electric potential of the other source/drain region toward an electric potential calculated by subtracting a threshold voltage $V_{th}$ of the driving transistor $TR_D$ from the reference voltage $V_{Ofs}$, is performed in units of a display device row.

In addition, during the second half (the second period) of the period $T_Q$, the writing process in which a video signal is applied to the gate electrode of the driving transistor $TR_D$ is sequentially performed Q times for N display devices 10 configuring the display device row DL.

Then, in the driving method of the embodiment, the writing process is sequentially performed Q times within a period not exceeding a half of the period $T_Q$, and the threshold voltage cancelling process is performed such that the length of a period (hereinafter, it may be abbreviated as a "waiting period") from the end of the threshold voltage cancelling process to the start of the writing process in each display device row DL configuring the group LG of display device rows is constant.

In addition, the operation performed during the waiting period will be described in detail in the description of the operation during [Period-TP($2$)$_3$] shown in FIG. 6.

In addition, in the driving method of the embodiment, the length of the period during which the threshold voltage cancelling process is performed in the display device rows DL configuring the group LG of display device rows is constant. In such a configuration, the relationship between the period during which the threshold voltage cancelling process is performed and the period during which the writing process is performed in the display device rows DL is the same for each display device row DL.

As represented in FIG. 4, the length of the first half (the first period) of the period $T_Q$ is a period of $Q\times t_a$. In addition, the length of the second half (the second period) of the period $T_Q$ is a period of $Q\times t_b$.

During the first period, a predetermined reference voltage $V_{Ofs}$ is applied to the data line DTL based on the operation of the signal output circuit 102. In addition, during the second period, video signals corresponding to display device rows DL are sequentially applied to the data lines DTL for each period $t_b$ based on the operation of the signal output circuit 102. In particular, between the start of the second period to the period $t_b$, a video signal $V_{Sig\_[p,1]}$ corresponding to the display device row DL of the [p, 1]-th row is applied to the data line DTL, and thereafter, a video signal $V_{Sig\_[p,2]}$ corresponding to the display device row DL of the [p, 2]-th row is applied to the data line DTL during the period $t_b$. The video signals $V_{Sig}$ corresponding to the display device row DL of the [p, 3]-th row and thereafter are similarly applied.

During the first period, the voltage of the data line DTL is the reference voltage $V_{Ofs}$. In the embodiment, the reference voltage $V_{Ofs}$ is applied to the gate electrode of the driving transistor $TR_D$ from the data line DTL through the writing transistor $TR_W$, and a predetermined driving voltage $V_{CC\text{-}H}$ is applied to one source/drain region of the driving transistor $TR_D$ from the feeder wire PS1. Accordingly, the threshold voltage cancelling process is performed. Therefore, the first period is a period within which the threshold voltage cancelling process can be performed.

Here, a period from the end of the first period to a time when the writing process of a video signal is performed becomes the longest for the display device row DL of the [p, Q]-th row based on the relationship of the order of the writing process, and the period becomes $(Q-1)\times t_b$. In other words, in the [p, Q]-th row, the waiting period is not shorter than $(Q-1)\times t_b$.

Accordingly, in the driving method of the embodiment, the threshold voltage cancelling process is performed such that the waiting time in the display device rows DL of the [p, 1]-th row to the [p, Q]-th row is constant, and more particularly, $(Q-1)\times t_b$. In particular, the end of the threshold voltage cancelling process is set so as to satisfy the above-described conditions. In addition, in such a case, under the condition that the waiting time is constant, the waiting time is set to be a shortest period as possibly can.

Then, in a case where the waiting time is set to be constant as $(Q-1)\times t_b$, the display device row DL in which the period from the start of the first period to the end of the threshold voltage canceling process is the shortest is the display device row of the [p, 1]-th row. The length $t_a'$ of this period can be represented as the following Equation (A).

$$t_a'=Q\times t_a-(Q-1)\times t_b=t_a+(Q-1)\times(t_a-t_b) \qquad \text{Equation } (A)$$

Accordingly, under the condition that the length of the period during which the threshold voltage cancelling process is performed is constant, the longest length of the period during which the threshold voltage cancelling process is performed is the above-described $t_a'$. According to the driving method of the embodiment, the threshold voltage cancelling process is performed such that a time between the start and the end of the threshold voltage cancelling process is $t_a'$, and all the waiting times in the display device rows DL of the [p, 1]-th row to the [p, Q]-th row are $(Q-1)\times t_b$.

In such a case, the length of a period from the start of the first period to the start of the threshold voltage cancelling process is the longest in the display device row DL of the [p, Q]-th row, and is the shortest in the display device row DL of the [p, 1]-th row. In the display device row DL of the [p, q]-th row, the length of the period from the start of the first period to the start of the threshold voltage cancelling process is $(q-1)\times t_b$.

Here, the writing process is sequentially performed Q times within a period not exceeding a half of the period $T_Q$. Accordingly, the second period is shorter than the first period. Here, the length of the first period is $Q\times t_a$, and the length of the second period is $Q\times t_b$. Accordingly, $t_a>t_b$. Therefore, the second term of Equation (A) has a positive value all the time. Compared to a case where the threshold voltage cancelling process and the writing process are performed within one horizontal scanning period (1H), the period during which the threshold voltage cancelling process is performed is lengthened. Accordingly, the threshold voltage cancelling process can be performed well.

In the driving method of an example in related art represented in FIG. 5, the threshold voltage cancelling process is performed during the first period. Accordingly, the length of the waiting period is different in the display device rows DL of the [p, 1]-th row to the [p, Q]-th row. On the contrary, according to the driving method of the embodiment, the waiting time is constant. Thus, even when the electric potential of the other source/drain region of the driving transistor $TR_D$ changes due to a leakage current during the waiting time or the like, the degree of the change is approximately the same in the display devices 10 configuring the display device rows DL of the [p, 1]-th row to the [p, Q]-th row.

The degree of change in the luminance that is accompanied by the above-described change in the electric potential of the other source/drain region of the driving transistor $TR_D$ is almost the same in the display devices 10 configuring the display device rows DL of the [p, 1]-th row to the [p, Q]-th row. Accordingly, it is difficult for the change in the relative luminance to be visually recognized. Therefore, the uniformity in the luminance of a displayed image can be improved.

Next, the operation of the n-th display device 10 disposed in the display device row DL of the [p, q]-th row will be described in detail.

In the description presented below, the value of the voltage or the electric potential is set as described below. However, this is only for the description. Thus, the value is not limited thereto.

$V_{Sig}$ (video signal for controlling luminance of the light emitting portion ELP): 1 volts (black display) to 8 volts (white display)

Figure 6:
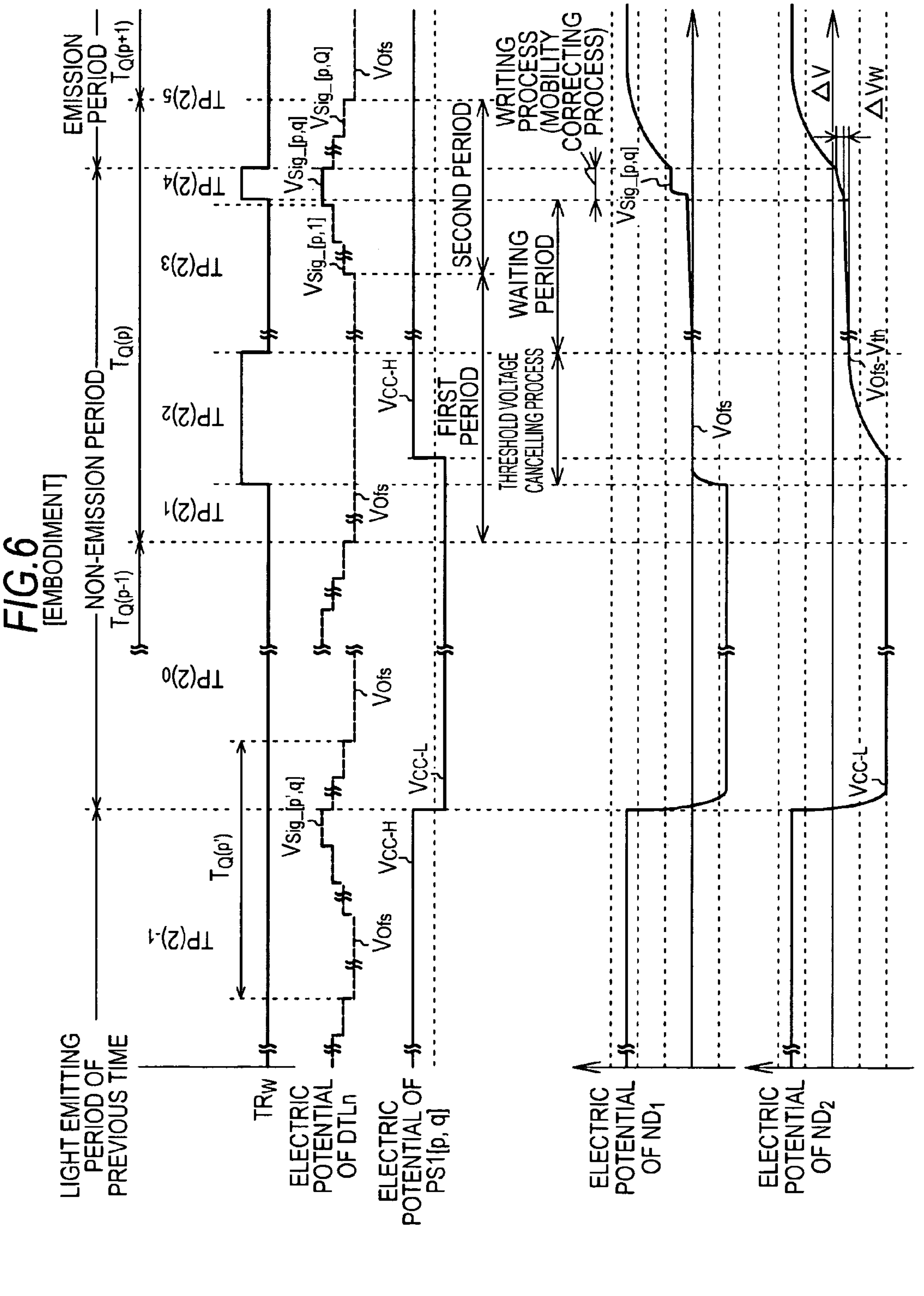
FIG. 6 is a schematic timing chart illustrating the operation of a display device in a method of driving a display apparatus according to an embodiment.

$V_{CC-H}$ (driving voltage for allowing a current to flow through the light emitting portion ELP): 20 volts $V_{CC-L}$ (second node initialization voltage): −10 volts $V_{Ofs}$ (reference voltage for initializing the electric potential of the gate electrode (electric potential of the first node $ND_1$) of the driving transistor $TR_D$): 0 volts $V_{th}$ (threshold voltage of the driving transistor $TR_D$): 3 volts $V_{Cat}$ (voltage applied to the cathode electrode of the light emitting portion ELP): 0 volts $V_{th-EL}$ (threshold voltage of the light emitting portion ELP): 3 volts FIG. 6 schematically shows a timing chart illustrating the operation of the display device 10 according to the driving method of the embodiment. FIGS. 7A to 7F and FIGS. 8A to 8C schematically represent the conductive state/the non-conductive state of transistors of the display device 10.

[Period-TP(2)$_{-1}$] (See FIGS. 6 and 7A)

[Period-TP(2)$_{-1}$] is, for example, a period during which the display devices 10 of the [p, q]-th row are in the light emission state after the operation of the previous display frame and the various processes of the previous time are completed. In other words, a drain current I'ds, which is based on Equation (5) to be described later, flows through the light emitting portion ELP of the display device 10 configuring the n-th sub-pixel of the [p, q]-th row, and the luminance of the display device 10 configuring the n-th sub-pixel of the [p, q]-th row has a value corresponding to the drain current I'ds. Here the writing transistor $TR_W$ is in the non-conductive state, and the driving transistor $TR_D$ is in the conductive state. The light emission state of the display devices 10 of the [p, q]-th row continues such that the length of the light emission period is constant. In the example represented in FIG. 6, the emission state continues until the end of the period during which a video signal $V_{Sig\_[p', q]}$ corresponding to the display device row DL of the [p', q]-th row is applied to the data line DTL in the period $T_Q$ (for convenience of the description, denoted by $T_Q$(p')) corresponding to the p'-th group of display device rows.

In addition, a reference voltage $V_{Ofs}$ and a video signal $V_{Sig}$ are applied to the data line $DTL_n$ in accordance with each period $T_Q$. However, the writing transistor $TR_W$ is in the non-conductive state. Thus, even when the electric potential (voltage) of the data line $DTL_n$ changes in [Period-TP(2)$_{-1}$], the electric potentials of the first node $ND_1$ and the second node $ND_2$ do not change (Actually, there may be a change in the electric potential due to capacitive coupling of parasitic capacitance or the like. However, such a change can be ignored.). This is similar in [Period-TP(2)$_0$] to be described later.

[Period-TP(2)$_0$] to [Period-TP(2)$_3$] shown in FIG. 6 is an operation period immediately prior to the next writing process after the light emission state is completed after completion of various processes of the previous time. During [Period-TP(2)$_0$] to [Period-TP(2)$_4$], the display device 10 of the [p, q]-th row is basically in the non-emission state. As shown in FIG. 6, [Period-TP(2)$_1$] to [Period-TP(2)$_4$] is included in the period $T_Q$ (for convenience of the description, denoted by a period $T_Q$ (p)) corresponding to the p-th group of display device rows $LG_p$. [Period-TP(2)$_5$] next to [Period-TP(2)$_4$] may include a part of the period $T_Q$ (p). In particular, a period from the end of the period during which a video signal $V_{Sig\_[p, q]}$ corresponding to the display device row DL of the [p, q]-th row is applied to the data line DTL to the end of the period $T_Q$ (p) is included in [Period-TP(2)$_5$].

Hereinafter, each period of [Period-TP(2)$_0$] to [Period-TP (2)$_5$] will be described.

[Period-TP(2)$_0$] (See FIGS. 6 and 7B)

[Period-TP(2)$_0$] is, for example, an operation period from the previous display frame to the current display frame. In other words, [Period-TP(2)$_0$] is a period from the start of application of a video signal $V_{Sig\_[p', q+1]}$ corresponding to the display device row DL of the [p', q+1]-th row of the previous display frame to the start of the period $T_Q$(p) of the current display frame. During this [Period-TP(2)$_0$], the display devices 10 of the [p, q]-th row is basically in the non-emission state. In the start of [Period-TP(2)$_0$], the voltage supplied from the power source unit 100 to the feeder wire $PS1_{[p, q]}$ changes from the driving voltage $V_{CC-H}$ to the second node initialization voltage $V_{CC-L}$. As a result, the electric potential of the second node $ND_2$ drops up to $V_{CC-L}$. Accordingly, a reverse voltage is applied between the anode electrode and the cathode electrode of the light emitting portion ELP, and thereby the light emitting portion ELP is in the non-emission state. In addition, the electric potential of the first node $ND_1$ (the gate electrode of the driving transistor $TR_D$) also drops following the decrease in the electric potential of the second node $ND_2$.

[Period-TP(2)$_1$] (See FIGS. 6 and 7C)

Then, the period $T_Q$ (p) of the current display frame starts. The voltage of the data line $DTL_n$ changes from the video signal of the previous period $T_Q$(p−1) to the reference voltage $V_{Ofs}$.

This [Period-TP(2)$_1$] corresponds to the start of the first period shown in FIG. 4 to the start of the threshold voltage cancelling process. The length of [Period-TP(2)$_1$] is (q−1)×$t_b$ as described with reference to FIG. 4. The display device 10 maintains the previous state.

[Period-TP(2)$_2$] (See FIG. 6 and FIGS. 7D to 7F)

[Period-TP(2)$_2$] corresponds to the period during which the threshold voltage cancelling process shown in FIG. 4 is performed. The length of this period is $t_a'=t_a+(Q-1)\times(t_a-t_b)$ as described with reference to FIG. 4. Then, the threshold voltage cancelling process in which the reference voltage $V_{Ofs}$ is applied to the gate electrode of the driving transistor $TR_D$ and a predetermined driving voltage is applied to one source/drain region so as to change the electric potential of the other source/drain region toward a voltage calculated by subtracting the threshold voltage $V_{th}$ of the driving transistor $TR_D$ from the reference voltage $V_{Ofs}$ is performed in units of a display device row.

In particular, by allowing the scanning line $SCL_{[p, q]}$ to be in the high level at the start of the [Period-TP(2)$_2$], the writing transistor $TR_W$ is in the conductive state (FIG. 7D). Then, the reference voltage $V_{Ofs}$ is applied to the gate electrode of the driving transistor $TR_D$ from the data line $DTL_n$. As a result, the electric potential of the first node $ND_1$ becomes $V_{Ofs}$ (0 volts). Since the second node initialization voltage $V_{CC\text{-}L}$ (−10 volts) is applied to the one source/drain region of the driving transistor $TR_D$ from the feeder wire PS1$_{[p, q]}$, the electric potential of the second node $ND_2$ continues to be $V_{CC\text{-}L}$.

The electric potential difference between the first node $ND_1$ and the second node $ND_2$ is 10 volts, and the threshold voltage $V_{th}$ of the driving transistor $TR_D$ is 3 volts. Accordingly, the driving transistor $TR_D$ is in the conductive state. In addition, the electric potential difference between the second node $ND_2$ and the cathode electrode included in the light emitting portion ELP is −10 volts and does not exceed the threshold voltage $V_{th\text{-}EL}$ of the light emitting portion ELP.

Thereafter, in the state in which the conductive state of the writing transistor $TR_W$ is maintained, the voltage of the feeder wire PS1$_{[p, q]}$ changes from the voltage $V_{CC\text{-}L}$ to the driving voltage $V_{CC\text{-}H}$. As a result, although the electric potential of the first node $ND_1$ does not change ($V_{Ofs}$=0 volts is maintained), the electric potential of the second node $ND_2$ changes toward the electric potential calculated by subtracting the threshold voltage $V_{th}$ of the driving transistor $TR_D$ from the electric potential of the first node $ND_1$. In other words, the electric potential of the second $ND_2$ rises (FIG. 7E).

When this [Period-TP(2)$_2$] is sufficiently long, the electric potential difference between the gate electrode and the other source/drain region of the driving transistor $TR_D$ arrives at $V_{th}$, and the driving transistor $TR_D$ is in the non-conductive state (FIG. 7F). In other words, the electric potential of the second node $ND_2$ comes close to $(V_{Ofs}-V_{th})$ and finally becomes $(V_{Ofs}-V_{th})$. Here, when the condition of the following Equation (2) is assured, in other words, when the electric potentials are selected and determined so as to satisfy Equation (2), the light emitting portion ELP does not emit light.

$$(V_{Ofs}-V_{th})<(V_{th\text{-}EL}+V_{Cat}) \quad \text{Equation (2)}$$

As described above, the electric potential of the second node $ND_2$ is determined depending only on the threshold voltage $V_{th}$ of the driving transistor $TR_D$ and the reference voltage $V_{Ofs}$. On the other hand, the electric potential of the second node $ND_2$ is regardless of the threshold voltage $V_{th\text{-}EL}$ of the light emitting portion ELP.

[Period-TP(2)$_3$] (See FIG. 6 and FIGS. 8A to 8B)

[Period-TP(2)$_3$] corresponds to the "waiting period" described with reference to FIG. 4. The length of this period is (Q−1)×$t_b$ as described with reference to FIG. 4. By allowing the scanning line $SCL_{[p, q]}$ to be in the low level at the start of [Period-TP(2)$_3$], the writing transistor $TR_W$ is in the non-conductive state (FIG. 8A).

When the driving transistor $TR_D$ reaches the non-conductive state in the threshold voltage cancelling process, ideally, the electric potentials of the first node $ND_1$ and the second node $ND_2$ do not change. However, actually, the electric potential of the second node $ND_2$ slowly changes (rises) from the electric potential set by the threshold voltage cancelling process due to a leakage current from the driving transistor $TR_D$ and or the light emitting portion ELP. On the other hand, when the driving transistor $TR_D$ does not reach the non-conductive state in the threshold voltage cancelling process, a current having a value exceeding the leakage current flows in the second node $ND_2$ through the driving transistor $TR_D$. Accordingly, the electric potential of the second node $ND_2$ changes (rises). The amount $\Delta V_W$ of change in the electric potential of the second node $ND_2$ during [Period-TP(2)$_3$] increases as the length of [Period-TP(2)$_3$], that is, the length of the waiting period is increased. In addition, the electric potential of the first node $ND_1$ also rises through a bootstrap operation.

In the driving method of an example in related art, the length of [Period-TP(2)$_3$] is different for each display device row, and accordingly, the above-described amount $\Delta V_W$ of change is different for each display device row. On the other hand, as described above, in the driving method of the embodiment, the length of [Period-TP(2)$_3$] is constant, and accordingly, the value of the above-described amount $\Delta V_W$ of change is approximately the same for the display devices 10.

[Period-TP(2)$_4$] (See FIGS. 6 and 8C)

A writing process is performed within this period during which a video signal $V_{Sig\_[p, q]}$ corresponding to the display device row DL of the [p, q]-th row is applied to the data line $DTL_n$. The writing transistor $TR_W$ is in the conductive state in accordance with a scanning signal transmitted from the scanning line $SCL_{[p, q]}$. Then, a video signal $V_{Sig\_[p, q]}$ is applied to the first node $ND_1$ from the data line $DTL_n$ through the writing transistor $TR_W$. As a result, the electric potential of the first node $ND_1$ rises to $V_{Sig\_[p, q]}$. The driving transistor $TR_D$ is in the conductive state.

Here, it is assumed that the value of the capacitor portion $C_1$ is $c_1$, and the value of the capacitance $C_{EL}$ of the light emitting portion ELP is $c_{EL}$. In addition, the value of capacitance between the gate electrode and the other source/drain region of the driving transistor $TR_D$ is assumed to be $c_{gs}$. When the value of capacitance between the first node $ND_1$ and the second node $ND_2$ is denoted by a sign $c_A$, $c_A=c_1+c_{gs}$. In addition, when the value of capacitance between the second node $ND_2$ and the second feeder wire PS2 is denoted by a sign $c_B$, $c_B=c_{EL}$. A configuration in which an additional capacitor portion is connected across the light emitting portion ELP in a parallel manner may be used. However, in such a case, a capacitance value of the additional capacitor portion is further added to $C_B$.

When the electric potential of the gate electrode of the driving transistor $TR_D$ changes from $V_{Ofs}$ to $V_{Sig\_[p,\ q]}$ ($>V_{Ofs}$), the electric potential between the first node $ND_1$ and the second node $ND_2$ is changed. In other words, the electric charge that is based on the amount ($V_{Sig\_[p,\ q]}-V_{Ofs}$) of change in the electric potential (=the electric potential of the first node $ND_1$) of the gate electrode of the driving transistor $TR_D$ is distributed in accordance with the value of capacitance between the first node $ND_1$ and the second node $ND_2$ and the value of capacitance between the second node $ND_2$ and second feeder wire PS2. However, when the value $c_b$ ($=c_{EL}$) is sufficiently larger than the value $c_A$ ($=c_1+c_{gs}$), the change in the electric potential of the second node $ND_2$ is small. Generally, the value $c_{EL}$ of the capacitance $C_{EL}$ of the light emitting portion ELP is greater than the value $c_1$ of the capacitor portion C1 and the value $c_{gs}$ of the parasitic capacitance of the driving transistor $TR_D$. For convenience of description, hereinafter, the change in the electric potential of the second node $ND_2$ that is generated in accordance with the change in the electric potential of the first node $ND_1$ will not be considered. In addition, in the driving timing chart shown in FIG. 6, the change in the electric potential of the second node $ND_2$ that is generated in accordance with the change in the electric potential of the first node $ND_1$ is not considered.

In the above-described writing process, in the state in which one source/drain region of the driving transistor in $TR_D$ is supplied with the driving voltage $V_{CC-H}$ from the feeder wire PS1$_{[p,\ q]}$, a video signal $V_{Sig\_[p,\ q]}$ is applied to the gate electrode of the driving transistor $TR_D$. Accordingly, as shown in FIG. 6, during [Period-TP (2)$_4$], the electric potential of the second node $ND_2$ rises. The amount of the rise ($\Delta V$ shown in FIG. 6) in the electric potential will be described later. When the electric potential of the gate electrode (the first node $ND_1$) of the driving transistor $TR_D$ is $V_g$, and the electric potential of the other source/drain region (second node $ND_2$) of the driving transistor $TR_D$ is $V_s$, the value of $V_g$ and the value of $V_s$ are as follows in a case where the rise in the electric potential of the second node $ND_2$ during [Period-TP (2)$_4$] is not considered. An electric potential difference between the first node $ND_1$ and the second node $ND_2$, that is, an electric potential difference $V_{gs}$ between the gate electrode of the driving transistor $TR_D$ and the other source/drain region serving as the source region can be represented as the following Equation (3).

$$V_g = V_{Sig\_[p,\ q]}$$

$$V_s \approx V_{Ofs} - V_{th} + \Delta V_W$$

$$V_{gs} \approx V_{Sig\_[p,\ q]} - (V_{Ofs} - V_{th} + \Delta V_W) \quad \text{Equation (3)}$$

In other words, $V_{gs}$ acquired in the writing process for the driving transistor $TR_D$ basically depends on the video signal $V_{Sig\_[p,\ q]}$ that is used for controlling the luminance of the light emitting portion ELP, the threshold voltage $V_{th}$ of the driving transistor $TR_D$, and the reference voltage $V_{Ofs}$. On the other hand, $V_{gs}$ is regardless of the threshold voltage $V_{th-EL}$ of the light emitting portion ELP.

Next, the rise in the electric potential of the second node $ND_2$ during the above-described [Period-TP(2)$_4$] will be described. In the above-described driving method, regarding a writing process, the writing process is performed in the state in which the one source/drain region of the driving transistor $TR_D$ is applied with a driving voltage, and whereby the electric potential of the other source/drain region of the driving transistor $TR_D$ is changed. Accordingly, a mobility correcting process that raises the electric potential (that is, the electric potential of the second node $ND_2$) of the other source/drain region of the driving transistor $TR_D$ in accordance with the characteristics (for example, the magnitude of the mobility μ or the like) of the driving transistor $TR_D$ is performed.

In a case where the driving transistor $TR_D$ is manufactured from a polysilicon thin film transistor or the like, it is difficult to avoid generation of variations in the mobility μ of the transistors. Thus, even when a video signal $V_{Sig}$ having the same value is applied to the gate electrodes of a plurality of driving transistors $TR_D$ having different mobility μ, there is a difference between a drain current $I_{ds}$ flowing through a driving transistor $TR_D$ having high mobility and a drain current $I_{ds}$ flowing through a driving transistor $TR_D$ having low mobility μ. When such a difference is generated, the uniformity of the screen of the display apparatus deteriorates.

In the above-described driving method, the video signal $V_{Sig\_[p,\ q]}$ is applied to the gate electrode of the driving transistor $TR_D$ in the state in which the one source/drain region of the driving transistor $TR_D$ is supplied with the driving voltage $V_{CC-H}$ by the feeder wire PS1$_{[p,\ q]}$. Accordingly, as shown in FIG. 6, the electric potential of the second node $ND_2$ rises during [Period-TP(2)$_4$]. In a case where the value of the mobility μ of the driving transistor $TR_D$ is high, the amount of rise $\Delta V$ (electric potential correcting value) in the electric potential (that is, the electric potential of the second node $ND_2$) of the other source/drain region of the driving transistor. $TR_D$ increases. On the other hand, in a case where the value of the mobility μ of the driving transistor $TR_D$ is low, the amount of rise $\Delta V$ (electric potential correcting value) in the electric potential of the other source/drain region of the driving transistor $TR_D$ decreases. Here, the electric potential difference $V_{gs}$ between the gate electrode of the driving transistor $TR_D$ and the other source/drain region serving as the source region is changed from Equation (3) as the following Equation (4).

$$V_{gs} \approx V_{Sig\_[p,\ q]} - (V_{Ofs} - V_{th} + \Delta V_W) - \Delta V \quad \text{Equation (4)}$$

In addition, the predetermined time (more precisely, a total time during which the writing transistor $TR_W$ is in the conductive state in [Period-TP(2)$_4$]) during which the writing process is performed may be determined in accordance with the design of the display device 10 or the display apparatus. In addition, the predetermined time during which the writing process is performed is determined such that the electric potential ($V_{Ofs}-V_{th}+\Delta V+\Delta V_W$) of the other source/drain region of the driving transistor $TR_D$ at this time satisfies the following Equation (2'). During [Period-TP(2)$_4$], the light emitting portion ELP does not emit light. By performing the mobility correcting process, the correction for the variations in the coefficient k ($\equiv(\frac{1}{2})\cdot(W/L)\cdot C_{ox}$) is simultaneously performed.

$$(V_{Ofs} - V_{th} + \Delta V + \Delta V_W) < (V_{th-EL} + V_{Cat}) \quad \text{Equation (2')}$$

[Period-TP(2)$_5$] (See FIGS. 6 and 8D)

By stopping the application of the video signal to the gate electrode of the driving transistor $TR_D$ after the writing process, a current corresponding to the value of a voltage maintained in the capacitor portion $C_1$ flows in the light emitting portion ELP through the source/drain region of the driving transistor $TR_D$.

Immediately prior to [Period-TP(2)$_5$], the scanning line $SCL_{[p,\ q]}$ is allowed to be in the low level based on the operation of the scanning circuit 101, the writing transistor $TR_W$ is in the non-conductive state, and the first node $ND_1$, that is, the gate electrode of the driving transistor $TR_D$ is electrically separated from the data line $DTL_n$.

Since the state in which the driving voltage $V_{CC-H}$ is applied to the one source/drain region of the driving transistor $TR_D$ from the feeder wire $PS1_{[p, q]}$ is maintained, as a result described above, the electric potential of the second node $ND_2$ rises.

Here, although there is the capacitor portion C1, a phenomenon that occurs in a so-called bootstrap circuit occurs in the gate electrode of the driving transistor $TR_D$, and the electric potential of the first node $ND_1$ also rises. As a result, the electric potential $V_{gs}$ between the gate electrode of the driving transistor $TR_D$ and the other source/drain region serving as the source region is maintained at the value represented in Equation (4).

In addition, the electric potential of the second node $ND_2$ rises to exceed ($V_{th-EL}+V_{cat}$), and, accordingly, the light emitting portion ELP starts emitting light (see FIG. 6F). At this time, the current flowing through the light emitting portion ELP is a drain current $I_{ds}$ flowing from the drain region to the source region of the driving transistor $TR_D$ and can be represented as Equation (1). Here, based on Equations (1) to (4), the equation (1) can be changed as in the following Equation (5).

$$I_{ds}=k\cdot\mu\cdot(V_{Sig\_[p,q]}-V_{Ofs}-\Delta V-\Delta V_W)^2 \quad \text{Equation (5)}$$

Accordingly, for example, when $V_{Ofs}$ is set to 0 volts, and $\Delta V >> \Delta V_W$, the current $I_{ds}$ flowing through the light emitting portion ELP is in proportion to the square of a value that is calculated by subtracting the electrical potential correcting value $\Delta V$ due to the mobility $\mu$ of the driving transistor $TR_D$ from the value of the video signal $V_{Sig\_[p, q]}$ that is used for controlling the luminance of the light emitting portion ELP. In other words, the current $I_{ds}$ flowing through the light emitting portion ELP does not depend on the threshold voltage $V_{th-EL}$ of the light emitting portion ELP and the threshold voltage $V_{th}$ of the driving transistor $TR_D$. In other words, the amount (luminance) of light emission of the light emitting portion ELP is not influenced by the threshold voltage $V_{th-EL}$ of the light emitting portion ELP and the threshold voltage $V_{th}$ of the driving transistor $TR_D$. The luminance of the display device 10 of the [p, q]-th row is a value corresponding to the related current $I_{ds}$.

In addition, as the mobility $\mu$ of the driving transistor $TR_D$ increases, the electric potential correcting value $\Delta V$ is increased, and thus the value of $V_{gs}$ on the left side of Equation (4) is decreased. Thus, in Equation (5), the value of $(V_{Sig\_[p, q]}-V_{Ofs}-\Delta V-\Delta V_W)^2$ decreases even in a case where the mobility $\mu$ is high. Accordingly, the variations in the drain current $I_{ds}$ due to the variations in the mobility $\mu$ of the driving transistor $TR_D$ (additionally, the variations in k) can be corrected. Therefore, the variations in the luminance of the light emitting portion ELP due to the variations in the mobility $\mu$ (additionally, the variations in k) can be corrected.

Then, the emission state of the light emitting portion ELP is continued until the end of the application period of the video signal $V_{Sig\_[p', q]}$ corresponding to the display device row DL of the [p', q]-th row during the period $T_Q(p')$ corresponding to the p'-th group of display device rows. This period becomes the light emitting period.

As presented above, preferred embodiments of the present invention have been described. However, the present invention is not limited thereto. The configurations or structures of the display apparatus or the display device and the processes in the method of driving the display device or the display apparatus, described in the embodiments, are examples and may be appropriately changed.

In the driving method of the embodiment, the waiting period is set to the shortest period under the condition that the waiting time is constant, and the period during which the threshold voltage cancelling process is performed is set to the longest period under the condition that the length of the period during which the threshold voltage cancelling process is performed is constant. However, the embodiments of the present invention are not limited thereto. Thus, the waiting time may not be necessarily set to the shortest period. In addition, the period during which the threshold voltage cancelling process is performed may not be necessarily set to the longest period.

In the driving method of the embodiment, the length of the period during which the threshold voltage cancelling process is performed in each display device row DL configuring the group LG of display device rows is described to be constant. In a case where a difference in the length of the period during which the threshold voltage cancelling process is performed does not have a special influence, in the display device rows DL of the [p, 1]-th row to the [p, Q]-th row, a configuration in which the threshold voltage cancelling process is started, for example, from the start of the first period may be used.

Figure 9:
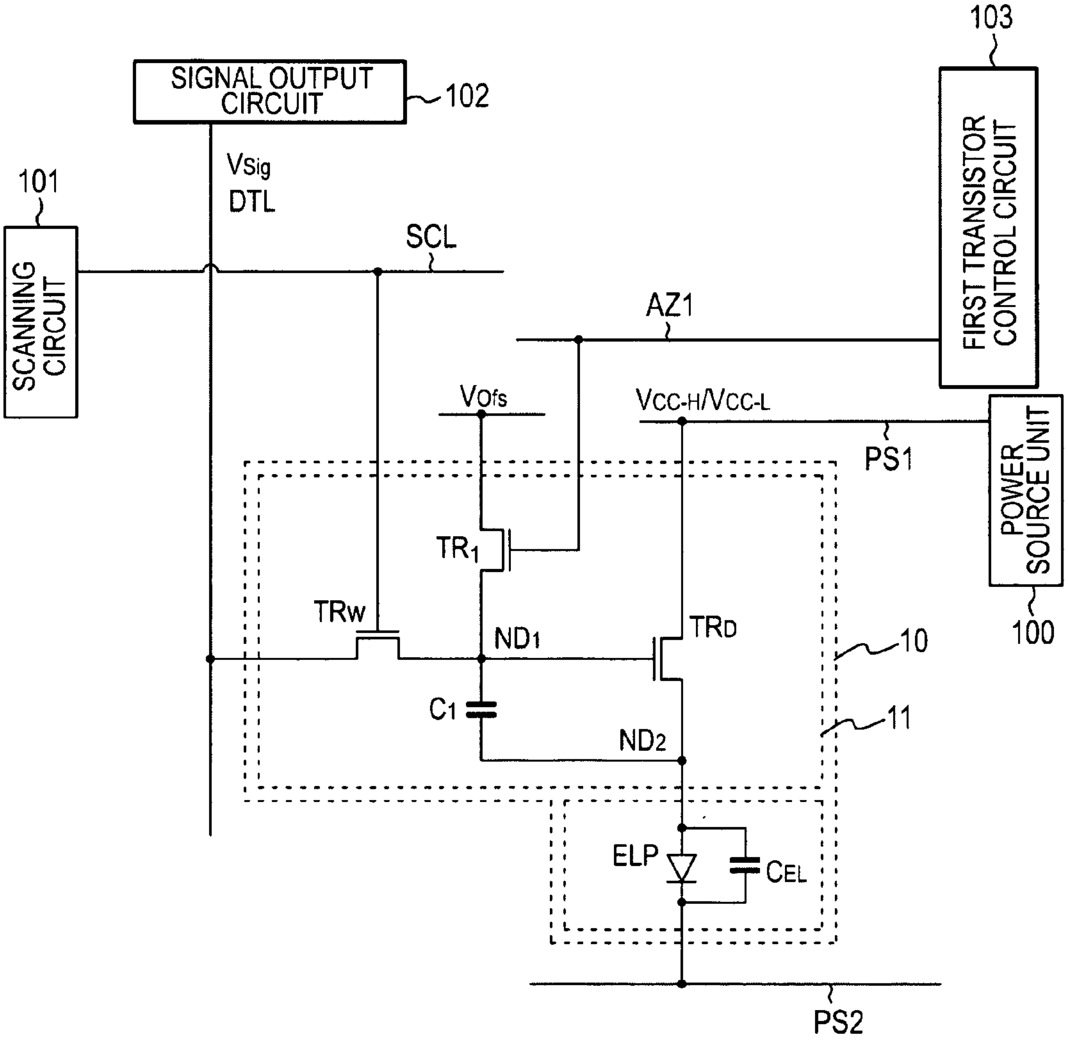
FIG. 9 is an equivalent circuit diagram showing a display device including a driving circuit.

As shown in FIG. 9, a configuration in which the driving circuit 11 configuring the display device 10 has a transistor (the first transistor $TR_1$) that is connected to the first node $ND_1$ may be used. In the first transistor $TR_1$, the reference voltage $V_{Ofs}$ is applied to one source/drain region, and the other source/drain region is connected to the first node $ND_1$. By applying a control signal transmitted from the first transistor control circuit 103 to the gate electrode of the first transistor $TR_2$ through the first transistor control line AZ1, the conduction state/non-conduction state of the first transistor $TR_1$ is controlled. Accordingly, the electric potential of the first node ND1 can be set. In addition, a configuration in which a different transistor is further included may be used.

In the embodiment, the driving transistor $TR_D$ is described as the n-channel type. In a case where the driving transistor $TR_D$ is the p-channel transistor, wirings may be formed such that the anode electrode and the cathode electrode of the light emitting portion ELP are interchanged. In addition, in such a configuration, the direction in which the drain current flows is changed, and accordingly, the value of the voltage applied to the feeder wire or the like may be appropriately changed.

The present application contains subject matter related to that disclosed in Japanese Priority Patent Application JP 2009-245176 filed in the Japan Patent Office on Oct. 26, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method of driving a display apparatus that is formed by arranging display devices each having a driving circuit and a current-driven type light emitting portion in a two dimensional matrix pattern in row and column directions, the driving circuit including at least a driving transistor having a gate electrode and source/drain regions, and a current flowing in the light emitting portion through the source/drain regions of the driving transistor, the method comprising the steps of:

when the number of rows of the display devices is denoted by M, the number of the display devices configuring each row is denoted by N, and a time calculated by dividing a total time for scanning the display devices of the first row to the M-th row for each row by M is denoted by a unit time $t_0$, performing a threshold voltage cancelling process in units of a display device row in which a predetermined reference voltage is applied to the gate electrode of the driving transistor of Q×N display devices configuring groups of the display device rows and a predetermined driving voltage is applied to one source/drain region of the Q×N display devices so as to change the electric potential of the other source/drain region toward an electric potential calculated by subtracting a threshold voltage of the driving transistor from the reference voltage during a period $T_Q$ that is represented by a product of the number Q of a plurality of the display device rows configuring each group of the display device rows, which is acquired by dividing the display devices of the M rows into a plurality of groups of the display device rows, and the unit time $t_0$; and sequentially performing a writing process, in which video signals are applied to the gate electrodes of the driving transistor of N display devices configuring the display device row, Q times, wherein the writing process is sequentially performed Q times within a period not exceeding a half of the period $T_Q$, and the threshold voltage cancelling process is performed such that a length of a period from the end of the threshold voltage cancelling process to the start of the writing process is constant in each display device row configuring the group of the display device rows.

2. The method according to claim 1, wherein the length of the period during which the threshold voltage cancelling process is performed is constant in each display device row that configures the group of the display device rows.

3. The method according to claim 1, wherein the display apparatus further includes a plurality of scanning lines extending in the row direction and a plurality of data lines extending in the column direction, the driving circuit further includes a writing transistor that has a gate electrode connected to the scanning line, one source/drain region that is connected to the data line, and the other source/drain region that is connected to the gate electrode of the driving transistor, by allowing the writing transistor to be in a conductive state based on a scanning signal transmitted from the scanning line, a video signal transmitted from the data line and a predetermined reference voltage are applied to the gate electrode of the driving transistor.

4. The method according to claim 1, wherein the electric potential of the other source/drain region of the driving transistor is changed by performing the writing process in a state in which a predetermined driving voltage is applied to the one source/drain region of the driving transistor.

5. The method according to claim 4, wherein the driving circuit further includes a capacitor portion that has one electrode connected to the other source/drain region of the driving transistor and the other electrode connected to the gate electrode of the driving transistor, the light emitting portion is connected to the other source/drain region of the driving transistor, and a current corresponding to the value of a voltage maintained in the capacitor portion flows in the light emitting portion through the source/drain region of the driving transistor by stopping application of the video signal to the gate electrode of the driving transistor after each writing process.

6. The method according to any one of claims 1 to 5, wherein the display apparatus further includes a plurality of feeder wires extending in the row direction, and the one source/driving region of the driving transistor is connected to the feeder wire, and a predetermined driving voltage is applied from the feeder wire to the one source/drain region of the driving transistor.

7. The method according to claim 1, wherein the light emitting portion is formed from an organic electroluminescent light emitting portion.

8. A display apparatus that is formed by arranging display devices each having a driving circuit and a current-driven type light emitting portion in a two dimensional matrix pattern in row and column directions, wherein the driving circuit includes at least a driving transistor having a gate electrode and source/drain regions, a current flows in the light emitting portion through the source/drain regions of the driving transistor, and when the number of rows of the display devices is denoted by M, the number of the display devices configuring each row is denoted N, and a time calculated by dividing a total time for scanning the display devices of the first row to the M-th row for each row by M is denoted by a unit time $t_0$, a threshold voltage cancelling process in which a predetermined reference voltage is applied to the gate electrode of the driving transistor of Q×N display devices configuring the groups of the display device rows and a predetermined driving voltage is applied to one source/drain region of the Q×N display devices so as to change the electric potential of the other source/drain region toward an electric potential calculated by subtracting a threshold voltage of the driving transistor from the reference voltage is performed in units of a display device row during a period $T_Q$ that is represented by a product of the number Q of a plurality of the display device rows configuring each group of the display device rows, which is acquired by dividing the display devices of the M rows into a plurality of groups of the display device rows, and the unit time $t_0$, and a writing process in which video signals are applied to the gate electrodes of the driving transistors of N display devices configuring the display device row is sequentially performed Q times within a period not exceeding a half of the period $T_Q$, and the threshold voltage cancelling process is performed such that a length of a period from the end of the threshold voltage cancelling process to the start of the writing process is constant in each display device row configuring the group of the display device rows.

9. A method of driving a display apparatus that is formed by arranging display devices each having a driving circuit and a light emitting portion in a matrix pattern in row and column directions, the method comprising the steps of:

performing a first process in which a predetermined reference voltage is applied to a gate electrode of a driving transistor in a plurality of rows; and sequentially performing a second process in which a video signal is applied to the gate electrode of the driving transistor in one row, wherein the first process is performed such that a length of a period from end of the first process to start of the second process is constant in each row.

10. The method according to claim 9, wherein the length of the period during which the first process is performed is constant in each row.

* * * * *